(12) United States Patent
Cao et al.

(10) Patent No.: US 10,736,064 B2
(45) Date of Patent: *Aug. 4, 2020

(54) EFFICIENT UPLINK TIMING SYNCHRONIZATION FOR FIXED-LOCATION M2M TERMINALS

(71) Applicant: Huawei Technologies Co., Ltd., Shenzhen (CN)

(72) Inventors: Yu Cao, Kanata (CA); Ming Jia, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,824

(22) Filed: Nov. 6, 2018

(65) Prior Publication Data

US 2019/0075532 A1 Mar. 7, 2019

Related U.S. Application Data

(63) Continuation of application No. 14/674,982, filed on Mar. 31, 2015, now Pat. No. 10,136,402.

(51) Int. Cl.
*H04W 56/00* (2009.01)
*H04W 4/70* (2018.01)
(52) U.S. Cl.
CPC ........... *H04W 56/001* (2013.01); *H04W 4/70* (2018.02)
(58) Field of Classification Search
None
See application file for complete search history.

(56) References Cited

U.S. PATENT DOCUMENTS

| | | | |
|---|---|---|---|
| 10,136,402 B2 * | 11/2018 | Cao ..................... | H04W 56/001 |
| 2008/0002660 A1 | 1/2008 | Jeong et al. | |
| 2008/0279131 A1 * | 11/2008 | Malladi ............. | H04W 56/0045 370/311 |
| 2011/0223932 A1 * | 9/2011 | Hole ................. | H04W 56/0005 455/456.1 |
| 2013/0116002 A1 | 5/2013 | Kim et al. | |

(Continued)

FOREIGN PATENT DOCUMENTS

| | | |
|---|---|---|
| CN | 101637054 | 1/2010 |
| CN | 103491622 | 1/2014 |

(Continued)

*Primary Examiner* — Ajit Patel
*Assistant Examiner* — Pamit Kaur
(74) *Attorney, Agent, or Firm* — Slater Matsil, LLP

(57) ABSTRACT

A method for determining synchronization of uplink timing in a machine type communication (MTC) system comprising a machine type communication device (MTCD) and a network element is disclosed that takes advantage of the MTCD being at a fixed location relative to the network element. The method includes receiving at the MTCD an uplink timing adjustment value from the network element and storing the uplink timing adjustment value at the MTCD. The MTCD then uses the stored uplink timing adjustment value from a previous uplink transmission for synchronizing uplink timing for a subsequent uplink transmission from the MTCD to the network element even following a period of inactivity of the MTCD, or expiration of any existing maximum uplink timing alignment period permitted for use of the timing adjustment value by the MTCD, or MTCD clock drift.

18 Claims, 11 Drawing Sheets

(56) References Cited

U.S. PATENT DOCUMENTS

| | | |
|---|---|---|
| 2013/0121315 A1 | 5/2013 | Langereis et al. |
| 2014/0073337 A1 | 3/2014 | Hong et al. |
| 2014/0293853 A1 | 10/2014 | Cho et al. |
| 2015/0085768 A1 | 3/2015 | Lunden et al. |
| 2016/0100374 A1 | 4/2016 | Choi et al. |

FOREIGN PATENT DOCUMENTS

| | | |
|---|---|---|
| CN | 104272822 | 1/2015 |
| WO | 2014196748 A1 | 12/2014 |

* cited by examiner

EFFICIENT UPLINK TIMING SYNCHRONIZATION FOR FIXED-LOCATION M2M TERMINALS

CROSS-REFERENCE TO RELATED APPLICATIONS

This application is a continuation of U.S. patent application Ser. No. 14/674,982, filed on Mar. 31, 2015, and entitled "Efficient Uplink Timing Synchronization for Fixed Location M2M Terminals," which application is hereby incorporated by reference herein in its entirety.

TECHNICAL FIELD

The present disclosure relates to machine-type communications ("MTC") or machine-to-machine ("M2M") communications and in particular to fixed-location M2M terminals, also referred to herein as machine-type communication devices ("MTCDs").

BACKGROUND

M2M communication is an important application for fifth generation mobile networks. However, fixed-location M2M communication poses significant challenges due to the large number of MTCDs and the diverse application requirements.

Due to the large number of MTCDs, uplink ("UL") timing synchronization is one consideration in M2M system design. A common application scenario for MTC is to support a massive number of meters and sensors that are deployed at fixed locations and infrequently report only small amounts of data. Therefore, one of the central issues for fixed-location M2M design is to reduce the overhead associated with acquiring and maintaining uplink timing synchronization. One problem is that using current long term evolution ("LTE") mechanisms requires that fixed-location MTCDs perform random access procedures to acquire uplink timing synchronization before each data transmission or upon expiration of an uplink timing alignment period, which sets a maximum time limit on uplink timing synchronization for a mobile network. Since this uplink timing synchronization procedure may have to be performed several times per second, there is a significant cost, both in terms of overhead and energy consumption. LTE uses a relatively short uplink timing alignment period ("TAP"), since it assumes that the user equipment ("UE") will be moving and the UE's internal clock will drift relative to the base station ("BS") timing element. One skilled in the art will appreciate that the term User Equipment (UE) is often used to refer to terminals, such as wirelessly connected handsets. In the context of the following discussion, M2M terminal devices will be considered as UEs despite the fact that a user may not typically directly interact with them.

In LTE, uplink timing synchronization is usually obtained by the base station sending a timing adjustment ("TA") signal to the user equipment in response to a random access request, or by sending a TA update from the base station to the UE. Open-loop ("OL") synchronization may also be used by the UE to deal with mobility issues. When the UE moves, it can adjust uplink timing to compensate for the movement based on downlink synchronization and its own internal clock. If the UE's internal clock does not drift, most of the timing alignment issues caused by UE mobility can be eliminated by this OL synchronization method. Thus, OL synchronization can reduce the need for TA update signaling from the base station. However, for MTC applications, since fixed-location MTCDs are usually inactive (i.e. sleep) for long periods of time to save energy, waking up only infrequently to transmit small amounts of data, they typically have internal clock drift over time. Hence, following such periods of inactivity, MTCDs will have lost the previous UL timing synchronization and will need to re-do the synchronization process to obtain a new TA value from the base station. Moreover, since LTE uses a relatively short uplink timing alignment period, requiring frequent updates of UL timing, the MTCD must conduct frequent synchronization procedures to request new TA values from the base station for each uplink transmission. All of this results in increased overhead and inefficient use of MTCD resources. Furthermore, since uplink transmission from the MTCD is infrequent, TA cannot be estimated frequently by the base station from uplink data transmission.

SUMMARY

What is needed, then, is a method of maintaining UL timing synchronization for fixed-location MTCDs that reduces overhead, is accurate, reduces complexity, and is insensitive to MTCD clock drift.

Accordingly then, in one aspect, there is provided a method for determining uplink timing for a next uplink transmission from a machine type communication device (MTCD) to a network element in a machine-type communication (MTC) system, the method comprising: calculating a downlink synchronization at the MTCD on a downlink frame received at the MTCD from the network element; and using the downlink synchronization together with a stored uplink timing adjustment value from a previous uplink transmission from the MTCD to the network element to calculate the uplink timing for the next uplink transmission from the MTCD to the network element.

In one aspect of the above method, the MTCD undergoes a period of inactivity between the previous uplink transmission and the next uplink transmission, where the period of inactivity may be greater than an uplink timing alignment period permitted for use of the timing adjustment value by the MTCD. In another aspect, an internal timing element of the MTCD drifts relative to a timing element of the network element between the previous uplink transmission and the next uplink transmission. In the method, the MTCD may be at a fixed location relative to the network element.

In another aspect, there is provided a method for determining uplink timing for an uplink transmission from a machine type communication device (MTCD) to a network element in a machine type communication (MTC) system, the method comprising: calculating a downlink synchronization at the MTCD on a downlink frame received at the MTCD from the network element; and using the downlink synchronization without using an uplink timing adjustment value to calculate the uplink timing for the uplink transmission from the MTCD to the network element.

In the above method, the MTCD may be at a fixed location relative to the network element. Alternatively, the MTCD may move relative to the network element before receiving the downlink frame from the network element. In one aspect, an internal timing element of the MTCD drifts relative to a timing element of the network element before the MTCD receives the downlink frame from the network element. In another aspect, the MTCD undergoes a period of inactivity before the MTCD receives the downlink frame from the network element, where the period of inactivity is greater than an uplink timing alignment period permitted for use of a timing adjustment value by the MTCD.

In a further aspect, there is provided a machine-type communication device (MTCD) for determining uplink timing for a next uplink transmission from the MTCD to a network element in a machine-type communication (MTC) system, the MTCD comprising a processor configured to: calculate a downlink synchronization on a downlink frame received at the MTCD from the network element; and use the downlink synchronization together with a stored uplink timing adjustment value from a previous uplink transmission from the MTCD to the network element to calculate the uplink timing for the next uplink transmission from the MTCD to the network element.

The MTCD may undergo a period of inactivity between the previous uplink transmission and the next uplink transmission, where the period of inactivity may be greater than an uplink timing alignment period. In one aspect, an internal timing element of the MTCD drifts relative to a timing element of the network element between the previous uplink transmission and the next uplink transmission. The MTCD may be at a fixed location relative to the network element.

In yet another aspect, there is provided a machine type communication device (MTCD) for determining uplink timing for an uplink transmission from the MTCD to a network element in a machine type communication (MTC) system, the MTCD comprising a processor configured to: calculate a downlink synchronization at the MTCD on a downlink frame received at the MTCD from the network element; and use the downlink synchronization without using an uplink timing adjustment value to calculate the uplink timing for the uplink transmission from the MTCD to the network element.

The MTCD may be at a fixed location relative to the network element. Alternatively, the MTCD may move relative to the network element before receiving the downlink frame from the network element. In one aspect, an internal timing element of the MTCD drifts relative to a timing element of the network element before the MTCD receives the downlink frame from the network element. In another aspect, the MTCD may undergo a period of inactivity before the MTCD receives the downlink frame from the network element, where the period of inactivity may be greater than an uplink timing alignment period permitted for use of a timing adjustment value by the MTCD.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Embodiments of the present disclosure provide a low-complexity, low-overhead, and accurate uplink timing synchronization method for fixed-location MTCDs. In the disclosed UL timing synchronization method the TA value is obtained from the base station and stored in the MTCD's memory. Subsequently, when the MTCD prepares for an uplink transmission the MTCD obtains uplink timing by performing downlink synchronization and may re-use the stored TA value from the previous uplink transmission. The stored TA value may be used by the MTCD for subsequent uplink transmissions, ignoring any maximum permitted uplink timing alignment period that may be set by the base station for use of the TA. Only when the MTCD moves to a new location relative to the base station, is there a need to obtain a new TA value from the base station.

In this method, one characteristic of the MTCD is exploited, that is, the majority of MTCDs are deployed at fixed locations relative to the base station. For example, large numbers of sensors are deployed at fixed locations to perform measurements and report data periodically. These devices do not change their locations relative to the base station during periods of inactivity, hence, to maintain uplink timing synchronization, it is possible to re-use the TA value obtained during a previous uplink timing synchronization process.

The term "UL timing" used herein, which is the timing in which the MTCD transmits signaling/data over the UL to the base station, can be indicated as a timing offset (in units of actual time such as µs, or in such units as slots, symbols, sub-frames or frames) with respect to a downlink ("DL") frame received from the base station to which the MTCD has matched a DL synchronization channel. "DL timing" indicates DL frame timing acquired through a DL synchronization channel.

Figure 1:
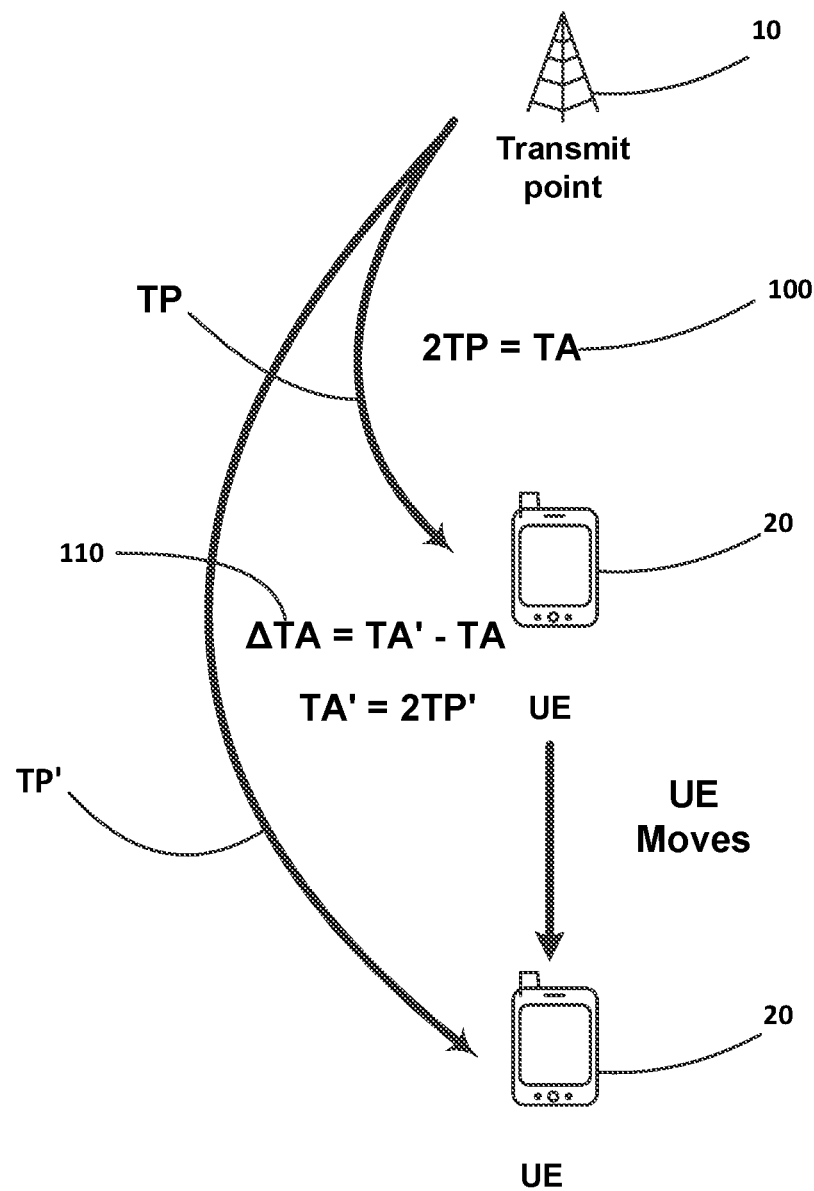
FIGS. 1, 2A and 2B illustrate prior art examples of UL timing synchronization in an existing LTE system.
Figure 2A:
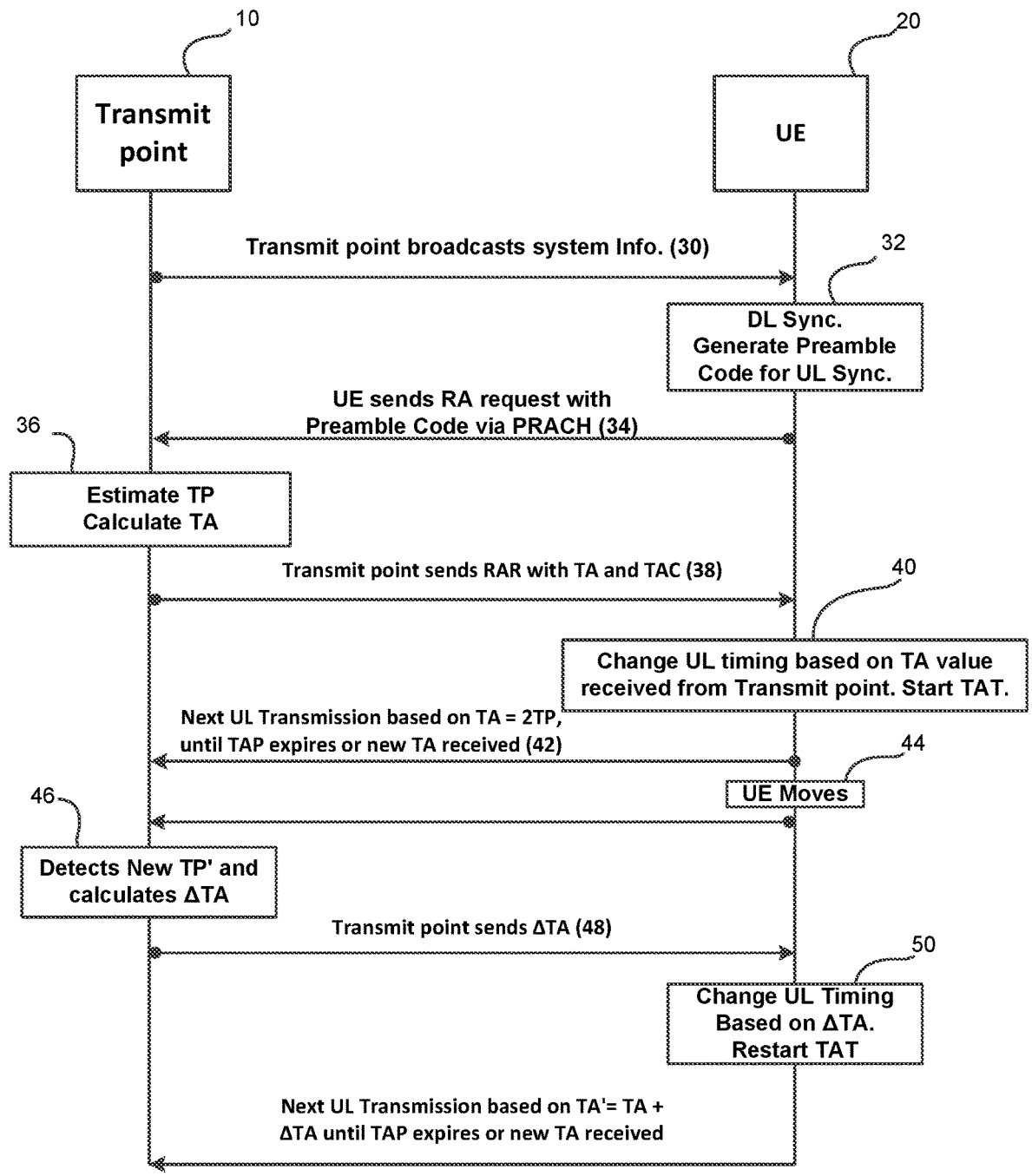

To better understand the uplink timing synchronization method described in the embodiments herein, it is helpful to review the existing UL timing synchronization method used in LTE. FIGS. 1 and 2A illustrate an example of UL timing synchronization in an existing LTE system. FIG. 1 is a schematic diagram showing an evolved Node B ("eNB"), base station, or transmit point 10 communicating with a mobile UE 20. The UE 20 performs DL timing synchronization and a random access ("RA") process to obtain an initial time adjustment value TA 100 from the transmit point 10. TA 100 is equal to twice the propagation delay ("TP") between the transmit point 10 and the UE 20. TA 100 is updated to TA' by adding ΔTA 110 when the UE 20 moves to a new location. ΔTA 110 is the difference between TA 100 at the original location of UE 20 and the time adjustment value TA' measured at the new location.

FIG. 2A illustrates an example of an UL timing synchronization procedure used in LTE. The transmit point 10 broadcasts system information at 30 that is received by the UE 20. The UE 20 performs DL synchronization and generates a preamble code at 32, which is a type of code sequence agreed upon between the UE 20 and the transmit point 10 to be used in the UL timing synchronization procedure. The UE 20 sends a random access ("RA") request at 34 including a long sequence preamble code to the transmit point 10 on the Physical Random Access Channel ("PRACH"). Upon receipt of the RA request at 34, the transmit point 10 determines a propagation delay ("TP") and calculates an uplink TA 100 at 36 that is sent to the UE 20 in a random access response ("RAR") message at 38. If the propagation delay for UE 20 is TP, then the estimated TA 100 is approximately 2TP. The UE 20 uses the TA 100 to update its UL transmission timing for the next UL transmission at 40. The UE 20 adjusts its UL timing by transmitting its uplink sub-frame earlier than the downlink sub-frame by TA seconds at 42. Consequently, the uplink sub-frame arrives to the transmit point 10 at the expected time, thus reducing interference with adjacent sub-frames assigned to other UEs.

The RAR sent from the transmit point 10 to the UE 20 may also include a timing alignment command ("TAC"), which configures and starts the UE's timing alignment timer ("TAT") and determines the uplink timing alignment period ("TAP"), which is the maximum length of time the transmit point 10 considers UE 20 to be uplink time aligned and permitted to use the TA 100 for adjusting its UL timing. Once the TAP expires, the UE deletes the current TA 100 and initiates a new random access request to obtain a new TA 100 from the transmit point 10, before it can perform another UL transmission. In LTE, the uplink timing alignment period is relatively short, since it is assumed that the UE 20 will be moving and its internal clock will drift over time.

When UE 20 moves to a new location at 44, the propagation delay changes from TP to TP'. At 46, if the UE 20 has not adjusted its timing based on its new location, transmit point 10 detects the discrepancy between the arrival time of the uplink sub-frame from UE 20 and the transmission time of the downlink sub-frame based on the change of location and any clock drift at the UE 20, and at 48 sends an updated time adjustment value ΔTA 110 to UE 20, which represents the difference between the previous TA 100 and a new timing adjustment value TA', for the UE 20 at the new location. At 50, UE 20 adjusts UL timing by using the new timing adjustment value TA', which is TA'=TA+ΔTA. transmit point 10 performs this calculation and sends ΔTA 110 to UE 20 independent of the TAP.

Once the updated time adjustment value ΔTA 110 is received by the UE 20 from transmit point 10, UE 20 restarts its TAT.

Figure 2B:
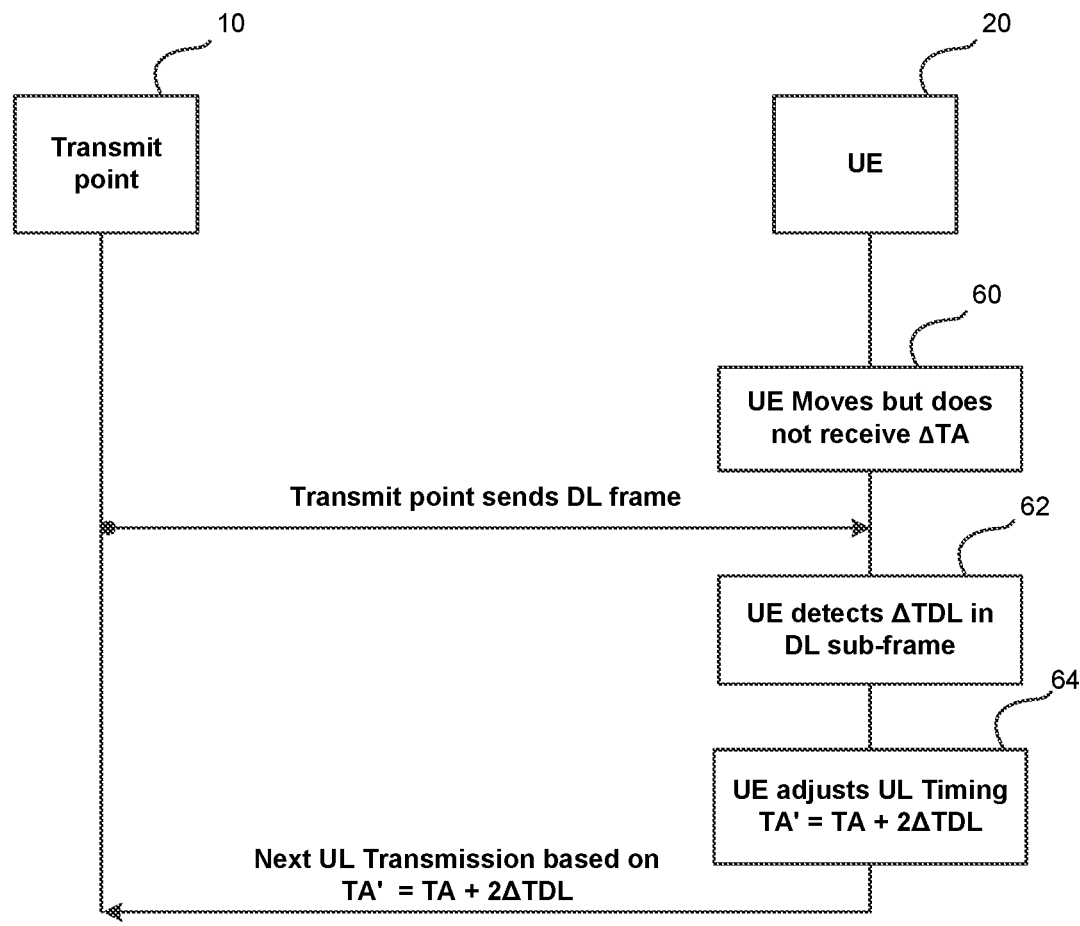

In the alternative, as illustrated in FIG. 2B at 60, when UE 20 moves but does not receive ΔTA 110 from transmit point 10 to compensate for the change in propagation delay from TP to TP', UE 20 has the option of applying another open-loop synchronization method to adjust UL timing on its own. In this alternate procedure, at 62, when UE 20 detects a significant difference, ΔTDL, between the actual arrival time of the DL sub-frame from transmit point 10 and the expected arrive time of the DL sub-frame, based on the previous DL timing, UE 20 adjusts the TA 100 to the new timing advance value TA', by applying a 2ΔTDL correction to the previous TA 100, TA'=TA+2ΔTDL, at 64. This alternate OL synchronization method is based on the assumption that the internal clock of UE 20 has not drifted since the last UL timing update.

From the above discussion, the reader will appreciate that one can obtain UL timing synchronization from DL timing if either the UE internal clock is accurate or the propagation delay does not change. Since the internal clock of MTCDs may drift over time, the above described alternate OL synchronization may not be capable of being accurately applied in M2M communications. Moreover, since one goal of the present disclosure is to reduce power consumption and reduce overhead, it is preferred to avoid repeating a random access request from the MTCD to the eNB each time the MTCD wakes up to transmit data, the uplink timing alignment period expires, or the MTCD loses UL timing synchronization due to internal clock drift. However, it is important to note that since the majority of MTCDs do not move relative to the eNB, propagation delay TP to the transmit point does not change for those MTCDs.

Figure 3:
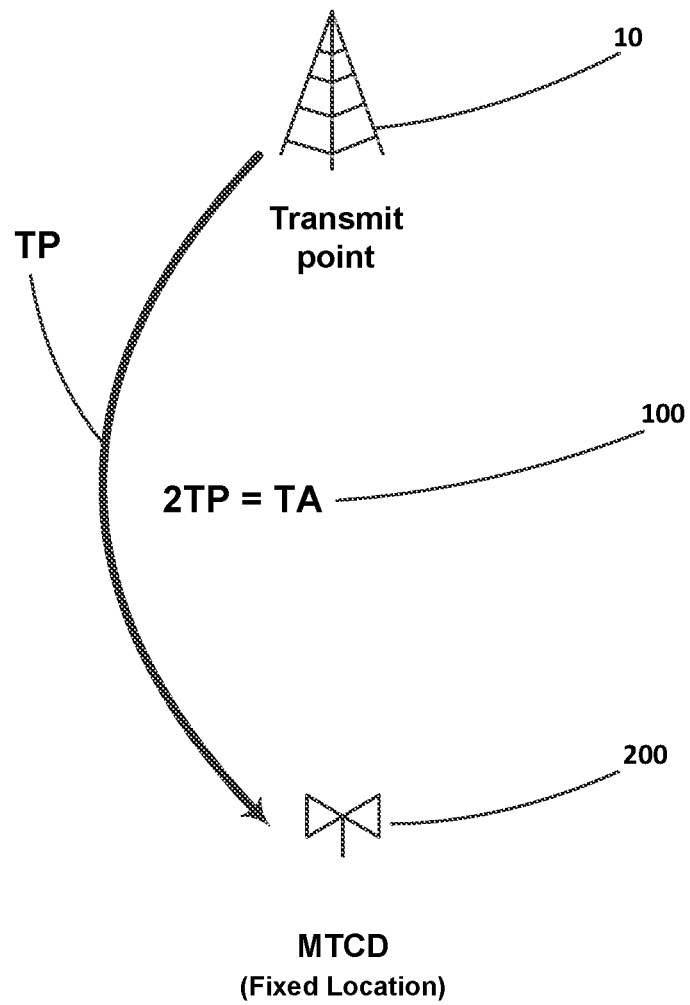
FIG. 3 illustrates a network element communicating with a machine-type communication device according to an embodiment.

FIG. 3 is a schematic diagram showing a network element such as an eNB or transmit point 10 communicating with a fixed-location MTCD 200. While the embodiments described herein use the terminology of LTE as examples, the present disclosure is not limited to any particular transmission terminology. In the disclosed method, after the initial random access procedure, the MTCD 200 stores the TA 100 in memory and uses the stored TA to adjust uplink timing for UL transmission to the transmit point 10. Since the MTCD 200 and the transmit point 10 do not move, the stored TA 100 from the previous UL transmission can be re-used to adjust UL timing for subsequent UL transmissions following DL synchronization, even if any existing maximum uplink timing alignment period permitted for use of the TA 100 has expired. Alternatively, the MTCD 200 may not be subject to a maximum uplink timing alignment period. This method is insensitive to any internal clock drift at the MTCD 200 since, even if the internal clock of the MTCD 200 drifts relative to an internal timing element of the transmit point 10 after a long period of inactivity, MTCD 200 can re-gain UL timing synchronization quickly by using DL timing synchronization and the stored TA 100 from a previous UL transmission. This avoids the wasting of resources by the MTCD 200 having to frequently re-do the initial random access procedure to obtain a new TA 100.

Figure 4:
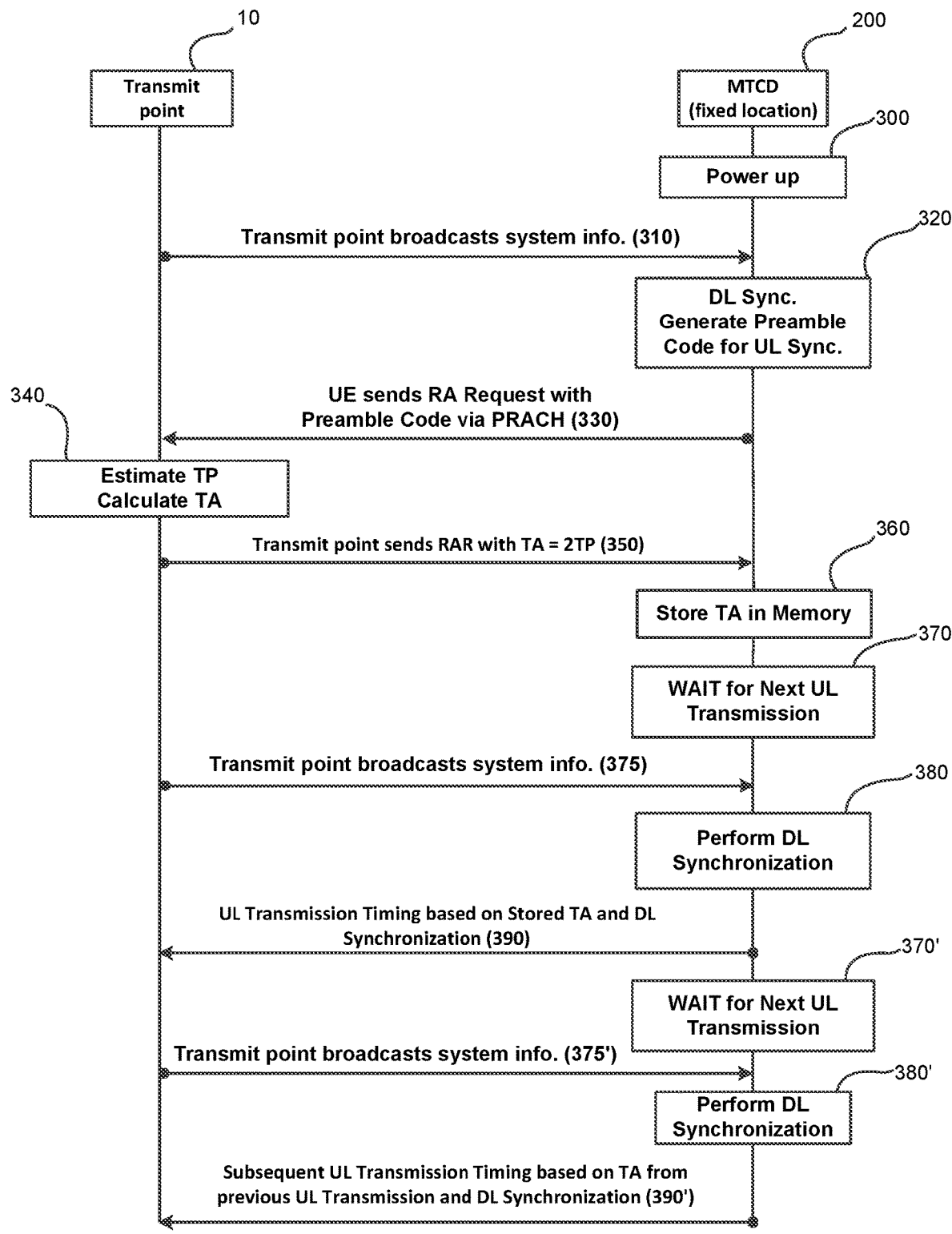
FIG. 4 is a process diagram illustrating a UL timing synchronization method according to a first embodiment.

FIG. 4 is a process diagram of a first disclosed UL transmission timing synchronization method for use with fixed-location MTCDs. At 300, the MTCD 200 powers up and performs the initial random access procedure to obtain TA 100 from transmit point 10. At 310, MTCD 200 receives system information from transmit point 10. At 320, MTCD 200 performs DL synchronization on the DL frame received from transmit point 10, and generates a long sequence preamble code, which is sent to the transmit point 10, at 330, in a random access request on the PRACH. Upon receipt of the RA request, transmit point 10, at 340, determines a propagation delay TP and calculates uplink timing adjustment value TA 100 that is sent to MTCD 200 in a random access response RAR message at 350. If the propagation delay for MTCD 200 is TP, then an estimated TA 100 is approximately 2TP. The RAR from transmit point 10 may include a timer alignment command ("TAC") that is intended to configure and start a timer alignment timer ("TAT") and define a maximum uplink timing alignment period during which the MTCD is permitted to use the TA 100. The MTCD 200 stores TA 100 in memory, at 360, for future use, and ignores the TAC. At 370, MTCD 200 waits for the next UL transmission, which may be scheduled by the transmit point 10 or determined by the MTCD 200 using a contended access transmission to the transmit point 10 without obtaining a scheduling grant from the transmit point 10 in advance. Prior to the next UL transmission, at 380, MTCD 200 performs DL synchronization based on a DL sub-frame received from transmit point 10 at 375. At 390, MTCD 200 adjusts its UL timing based on the stored TA 100 and the DL synchronization and sends the next UL transmission to the transmit point 10 based on the adjusted uplink timing. Subsequently, as shown at 370', 375', 380' and 390', since the location of MTCD 200 is fixed relative to transmit point 10 and the propagation delay TP does not change, the uplink timing for subsequent UL transmissions from MTCD 200 to transmit point 10, may be based on the stored TA 100 from a previous UL transmission and the DL synchronization, without the need to re-do the random access request to generate a new TA 100, even if an internal timing element of the MTCD 200 drifts relative to a timing element of the transmit point 10 and even if any existing maximum uplink timing alignment period permitted for use of the TA 100 has expired, following a period of inactivity of the MTCD 200.

The intention of this first disclosed UL transmission timing synchronization method is for the MTCD 200 to use the stored TA 100 from a previous UL transmission for future UL transmissions to the transmit point 10. However, advantages over the prior art will be realized and resources will be conserved so long as the stored TA 100 from a previous UL transmission is used for at least one UL transmission following expiration of any existing maximum uplink timing alignment period for use in a mobile network. Advantages will also be realized it the MTCD 200 uses the stored TA 100 from a previous UL transmission for at least one UL transmission following a period of inactivity of the MTCD 200 during which the internal clock of the MTCD 200 may have drifted.

Figure 5:
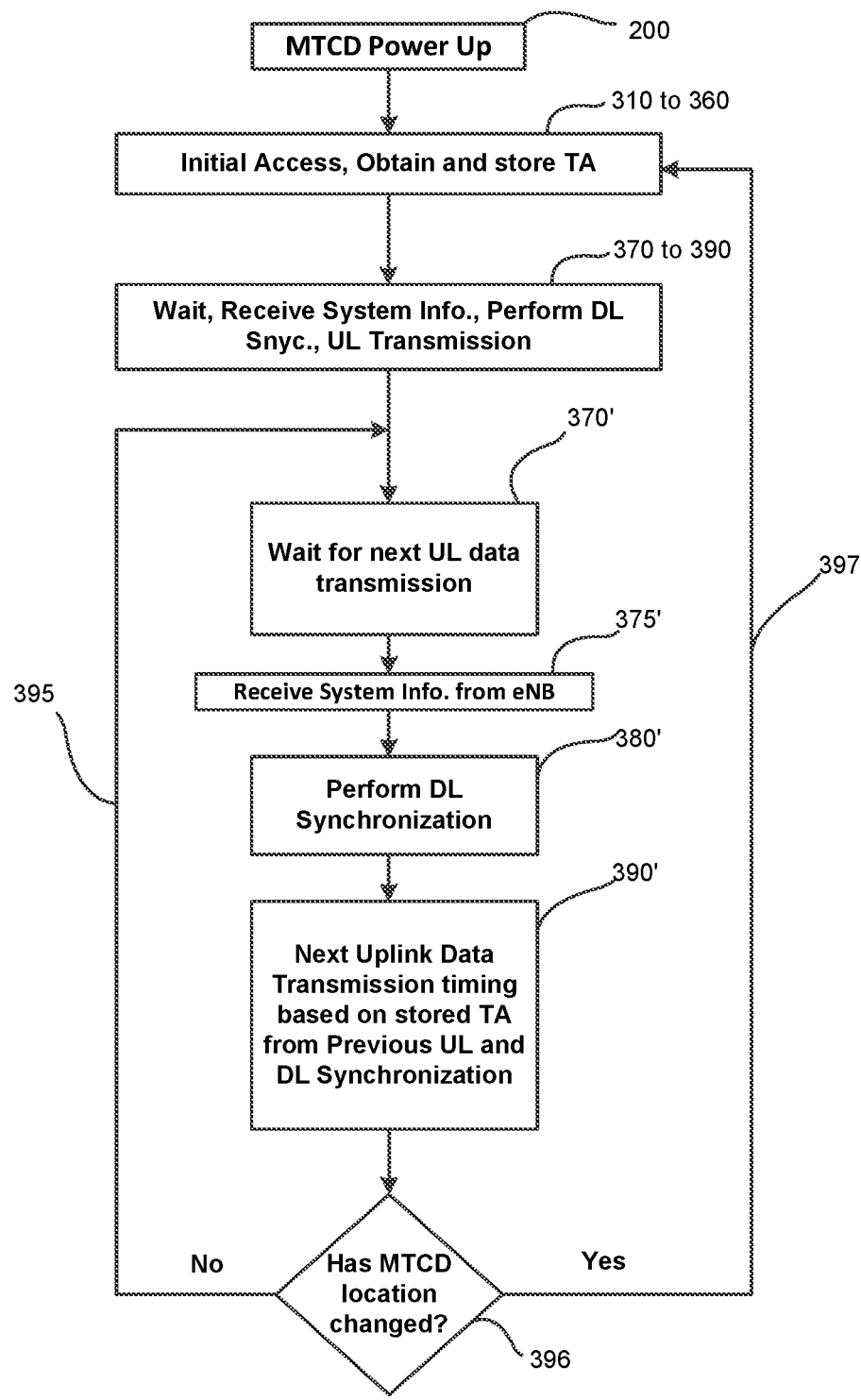
FIG. 5 illustrates the synchronization process of the method of FIG. 4 in a block diagram.

FIG. 5 shows the synchronization process of the first disclosed method in a block diagram, following the same procedure described above for FIG. 4. Items 310 to 360 from FIG. 4 are condensed into one block on the diagram in FIG. 5. Items 370 to 390 from FIG. 4 are condensed into a second block on the diagram in FIG. 5. Items 370' to 390' show that UL timing for subsequent UL transmissions is based on the stored TA 100 from a previous UL transmission and DL synchronization. FIG. 5 shows, a decision box 396, a decision path 395, and a decision path 397. Once TA 100 is stored in the MTCD's memory, if the location of the MTCD 200 has not changed at 396, decision path 395 shows that the stored TA 100 from a previous UL transmission is used for subsequent UL transmissions from the MTCD 200 to the transmit point 10, with no need to update the TA 100 even if any existing maximum uplink timing alignment period permitted for use of the TA 100 has expired or the internal clock of the MTCD 200 drifts following a period of inactivity of the MTCD 200.

Should the location of MTCD 200 change at 396 relative to the transmit point 10, decision path 397 shows that it would be necessary to re-execute 310 to 360, to obtain a new updated TA value 100 from the transmit point 10, which is then used by MTCD 200 along with an updated DL synchronization to calculate an updated UL transmission timing. This updated TA value 100 could then be used for an extended period of time, provided the MTCD 200 remains at the new location.

Figure 6A:
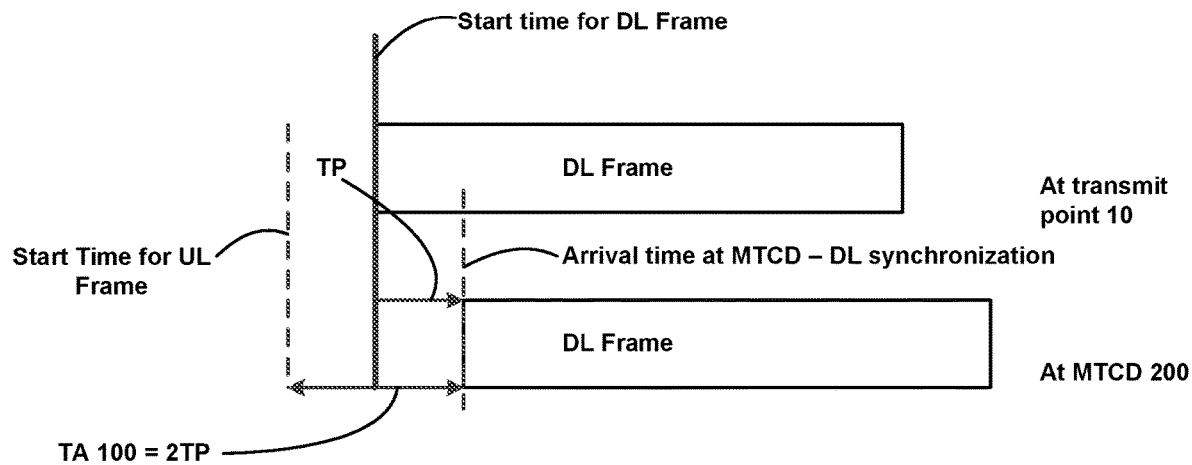
FIGS. 6A and 6B illustrate the timing relationship between the base station and the machine-type communication device of FIG. 4.
Figure 6B:
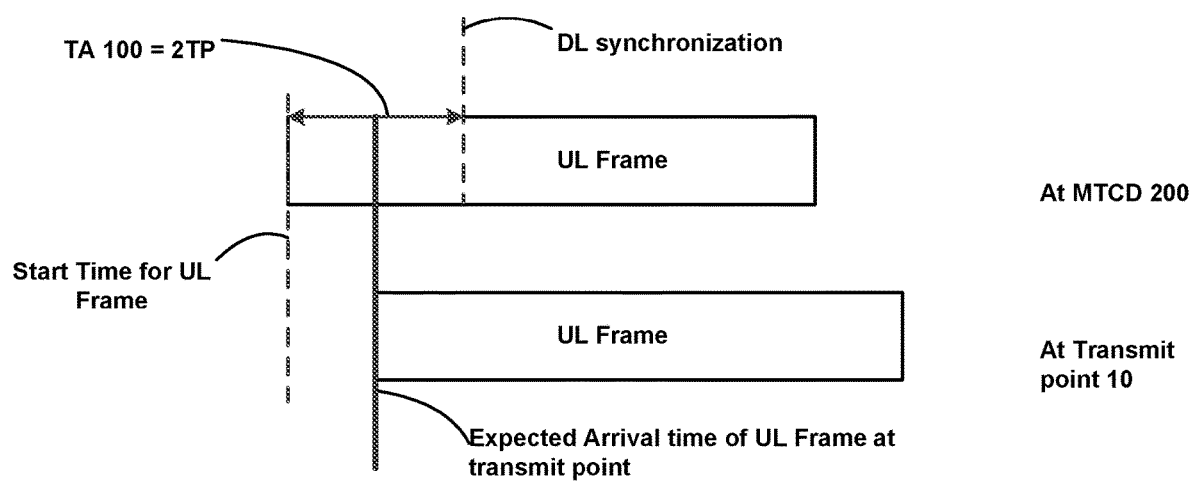

FIGS. 6A and 6B show the UL and DL timing relationship between the transmit point 10 and the MTCD 200, relative to the start time of the DL frame from the transmit point 10. FIG. 6A shows that the propagation delay TP is the time it takes the DL frame to arrive at the MTCD 200. Transmit point 10 calculates TP based on the random access request from the MTCD 200 and sends the TA 100=2TP to the MTCD 200. The MTCD 200 stores the TA 100 and uses it to determine when to send the UL frame based on the arrival time of the DL frame (that is, DL frame synchronization). By adding TA 100 to the DL frame synchronization, FIG. 6B shows that the UL frame arrives at the transmit point 10 at the expected time, synchronized with the DL frame, thus reducing interference with UL transmissions from other devices in adjacent sub-frames.

This first method of determining UL transmission timing for fixed location MTCDs results in very low overhead, since the TA 100 is only obtained one time for each MTCD. This procedure can be done in off-peak hours or using mechanisms such as random back-off to mitigate collisions. The method is accurate since it is not sensitive to the MTCD's internal clock drift. The method allows the MTCD to sleep for a long period of time, thereby saving energy without being concerned about losing uplink timing. The MTCD is able to quickly regain UL synchronization based on the DL transmission and the stored TA 100 from the previous UL transmission only, regardless of its state. No further random access process is required. This method also simplifies M2M PHY design, since interference among adjacent slots for fixed-location MTCDs is eliminated.

Figure 7:
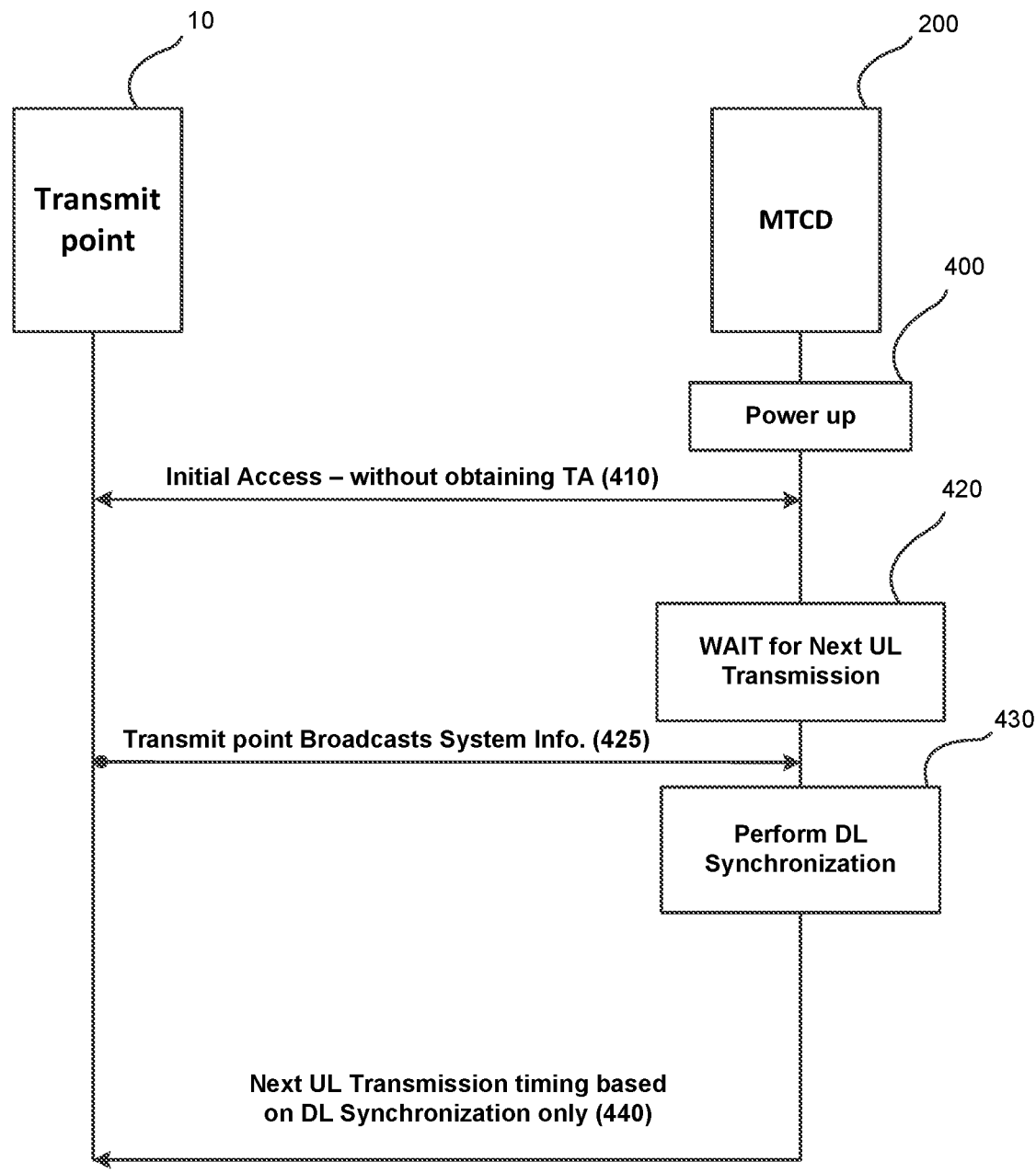
FIG. 7 is a process diagram illustrating a second UL timing synchronization method according to a second embodiment.

Referring to FIG. 7, a second disclosed UL transmission timing synchronization method is shown in a process diagram. The second UL transmission timing synchronization method relies solely on DL timing synchronization and does not obtain TA 100 from transmit point 10. TA 100 is assumed to be zero. In the second method, the MTCD 200 powers up at 400 and makes initial contact with the transmit point 10 at 410 by receiving system information from transmit point 10, but does not request a TA 100 from transmit point 10. MTCD 200 merely waits at 420 for the next UL transmission, which may be scheduled by the transmit point 10 or determined by the MTCD 200 using a contended access transmission to the transmit point 10 without obtaining a scheduling grant from the transmit point 10 in advance. Prior to the next UL transmission, MTCD 200 at 425 receives system information from transmit point 10. At 430 MTCD 200 performs DL timing synchronization based on the DL sub-frame received from transmit point 10 at 425, and at 440, MTCD 200 adjusts its UL timing based only on the DL timing synchronization, and sends the next UL transmission to the transmit point 10 based on the adjusted UL timing. UL timing is calculated based only on DL timing synchronization, without using any uplink timing adjustment value, for future UL transmissions from the MTCD 200 to the transmit point 10, regardless of any movement of the MTCD 200 relative to the transmit point 10, any drifting of an internal timing element of the MTCD 200 relative to a timing element of the transmit point 1o, or the expiration of any existing maximum uplink timing alignment period permitted for use of an uplink timing adjustment value in a mobile network.

Figure 8:
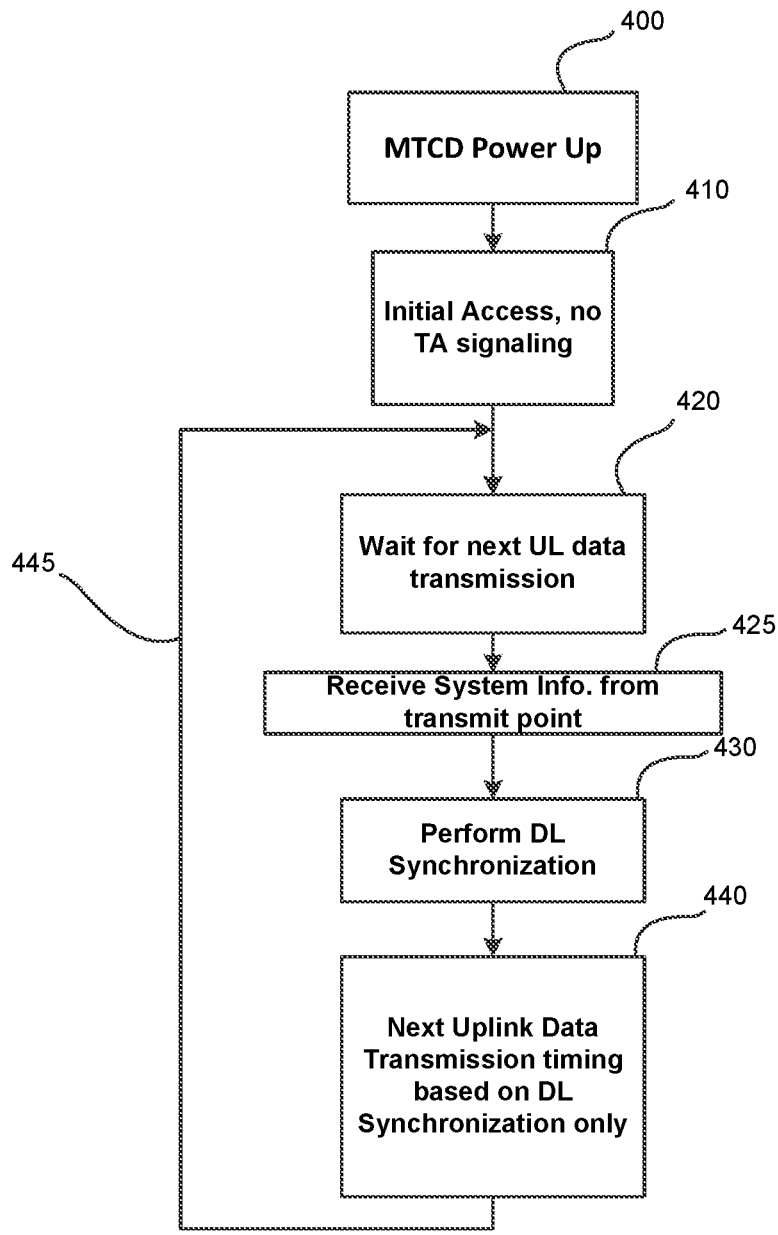
FIG. 8 illustrates the synchronization process of the method of FIG. 7 in a block diagram.

FIG. 8 shows the synchronization process of the second disclosed method in a block diagram, following the same procedure described above for FIG. 7. FIG. 8 shows, by the loop at 445, that future UL transmissions from the MTCD 200 to the transmit point 10 are based on DL synchronization only.

Figure 9:
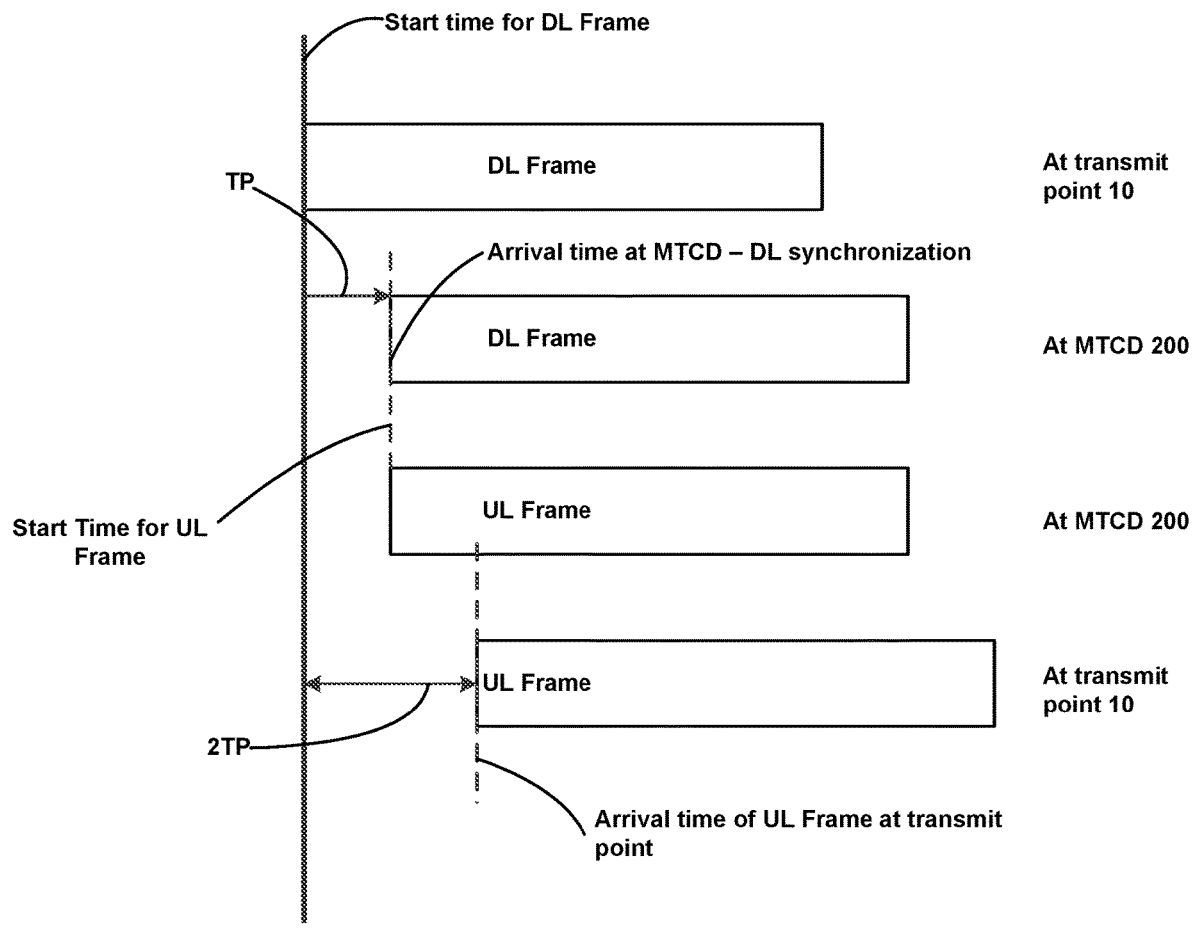
FIG. 9 illustrates the timing relationship between the base station and the machine-type communication device of FIG. 7.

FIG. 9 shows the UL and DL timing relationship between the transmit point 10 and the MTCD 200, relative to the start time of the DL frame from the transmit point 10 for this second method. Propagation delay TP is not taken into consideration. MTCD 200 performs DL synchronization on the DL frame and adjusts its UL timing based on the DL timing synchronization only. FIG. 9 shows that MTCD 200 sends the next UL transmission to the transmit point 10 one TP late, resulting in the late arrival of the UL frame at the transmit point 10 by 2TP. In this situation, the transmit point 10 may need to employ other techniques to mitigate or eliminate interference from the adjacent time slots caused by the propagation delay. However, this may be desirable in some situations, for example if the additional resources that may be required at the transmit point 10 are offset by the savings achieved by reducing overhead at the MTCD 200. Moreover, it is anticipated that communication systems could be specially designed to be insensitive to such propagation delays.

The intention of this second disclosed UL transmission timing synchronization method is for the MTCD 200 to only use DL synchronization to calculate UL timing for UL transmissions to the transmit point 10. However, advantages over the prior art will be realized and resources will be conserved so long as only DL synchronization is used to calculate UL timing for at least one UL transmission following expiration of any existing maximum uplink timing alignment period that may be required in a mobile network.

This second UL timing synchronization method can achieve a reduced overhead for a MTC system and may be applied to both fixed location and mobile MTCDs.

The above functionality may be implemented on any one or combination of network elements. FIG. to is a block diagram of a processing system 500 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 510 may comprise a processing unit equipped with one or more input/output devices, such as a speaker, microphone, mouse, touchscreen, keypad, keyboard, printer, display, and the like. The processing unit may include a central processing unit (CPU) 520, memory 530, a mass storage device 540, a video adapter 56o, and an I/O interface 570 connected to a bus 590.

The bus 590 may be one or more of any type of several bus architectures including a memory bus or memory controller, a peripheral bus, video bus, or the like. The CPU 520 may comprise any type of electronic data processor. The memory 530 may comprise any type of system memory such as static random access memory (SRAM), dynamic random access memory (DRAM), synchronous DRAM (SDRAM), read-only memory (ROM), a combination thereof, or the like. In an embodiment, the memory 530 may include ROM for use at boot-up, and DRAM for program and data storage for use while executing programs.

The mass storage device 540 may comprise any type of storage device configured to store data, programs, and other information and to make the data, programs, and other information accessible via the bus. The mass storage device 540 may comprise, for example, one or more of a solid state drive, hard disk drive, a magnetic disk drive, an optical disk drive, or the like.

The video adapter 560 and the I/O interface 570 provide interfaces to couple external input and output devices to the processing unit. As illustrated, examples of input and output devices include the display 562 coupled to the video adapter and the mouse/keyboard/printer 572 coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit 510 also includes one or more network interfaces 58o, which may comprise wired links, such as an Ethernet cable or the like, and/or wireless links to access nodes or different networks. The network interface 580 allows the processing unit to communicate with remote units via the networks. For example, the network interface 580 may provide wireless communication via one or more transmitters/transmit antennas and one or more receivers/receive antennas. In an embodiment, the processing unit 510 is coupled to a local-area network or a wide-area network, shown as network 582, for data processing and communications with remote devices, such as other processing units, the Internet, remote storage facilities, or the like.

Figure 10:
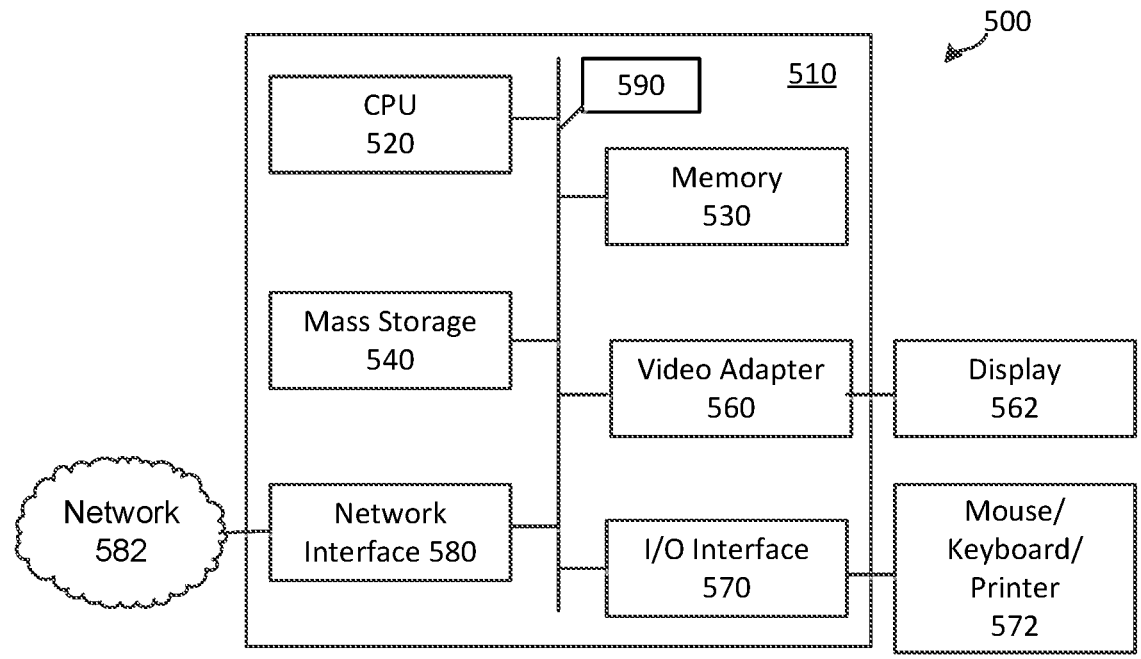
FIG. 10 is a block diagram illustrating a computing platform.
Figure 11:
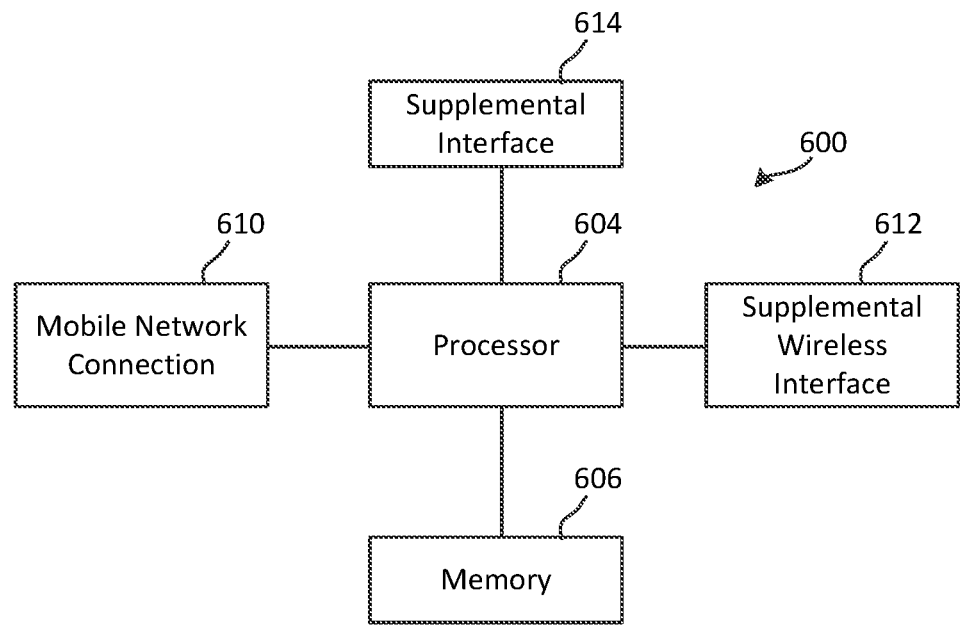
FIG. 11 is a block diagram of an embodiment communications device.

FIG. 11 illustrates a block diagram of an embodiment of a communications device 600, which may be equivalent to one or more devices (e.g., UEs, NBs, MTCDs, etc.) discussed above. The communications device 600 may include a processor 604, a memory 606, a mobile network connection 610, a supplemental wireless interface 612, and a supplemental interface 614, which may (or may not) be arranged as shown in FIG. 10. The processor 604 may be any component capable of performing computations and/or other processing related tasks, and the memory 606 may be any component capable of storing programming and/or instructions for the processor 604. The mobile network connection 610 may be any component or collection of components that allows the communications device 600 to communicate using a mobile network signal, and may be used to receive and/or transmit information over a mobile network connection of a mobile network. The supplemental wireless interface 612 may be any component or collection of components that allows the communications device 600 to communicate via a non-mobile network wireless protocol, such as a Wi-Fi or Bluetooth protocol, or a control protocol. The device 600 may use the mobile network connection 610 and/or the supplemental wireless interface 612 to communicate with any wirelessly enabled component, e.g., a base station, relay, mobile device, etc. The supplemental interface 614 may be any component or collection of components that allows the communications device 600 to communicate via a supplemental protocol, including wire-line protocols. In embodiments, the supplemental interface 614 may allow the device 600 to communicate with another component, such as a backhaul network component.

Through the descriptions of the preceding embodiments, the teachings of the present disclosure may be implemented by using hardware only or by using a combination of software and hardware. Software or other computer executable instructions for implementing one or more embodiments, or one or more portions thereof, may be stored on any suitable computer readable storage medium. The computer readable storage medium may be a tangible or in transitory/non-transitory medium such as optical (e.g., CD, DVD, Blu-Ray, etc.), magnetic, hard disk, volatile or non-volatile, solid state, or any other type of storage medium known in the art.

Additional features and advantages of the present disclosure will be appreciated by those skilled in the art.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Moreover, the previous detailed description is provided to enable any person skilled in the art to make or use one or more embodiments according to the present disclosure. Various modifications to those embodiments will be readily apparent to those skilled in the art, and the generic principles defined herein may be applied to other embodiments without departing from the spirit or scope of the teachings provided herein. Thus, the present methods, systems, and or devices are not intended to be limited to the embodiments disclosed herein. The scope of the claims should not be limited by these embodiments, but should be given the broadest interpretation consistent with the description as a whole. Reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

Furthermore, nothing herein is intended as an admission of prior art or of common general knowledge. Furthermore, citation or identification of any document in this application is not an admission that such document is available as prior art, or that any reference forms a part of the common general knowledge in the art. Moreover, nothing disclosed herein is intended to be dedicated to the public regardless of whether such disclosure is explicitly recited in the claims.

What is claimed is:

1. A method, the method comprising:
    obtaining, by a machine type communication device (MTCD) from a network element, an initial uplink timing adjustment value during an initial random access procedure;
    after the obtaining, performing, by the MTCD, a downlink synchronization based on a downlink signal received from the network element; and
    transmitting, by the MTCD, an uplink signal based on the downlink synchronization and the initial uplink timing adjustment value, the uplink signal being transmitted without performing an additional random access procedure and without waiting for a new timing advance signal.

2. The method of claim 1, further comprising:
    storing, by the MTCD, the initial uplink timing adjustment value.

3. The method of claim 1, wherein the uplink signal is a data signal.

4. The method of claim 1, wherein a period between the obtaining and the transmitting the uplink signal comprises a period of sleep of the MTCD.

5. The method of claim 4, wherein the period of sleep is greater than an uplink timing alignment period.

6. The method of claim 1, wherein the MTCD is at a fixed location relative to the network element.

7. The method of claim 1, wherein an internal timing element of MTCD drifts relative to a timing element of the network element before the MTCD receives the downlink signal from the network element.

8. The method of claim 1, wherein timing advance signaling is disabled for the MTCD.

9. A machine type communication device (MTCD), the MTCD comprising:
    a processor; and
    a non-transitory computer readable storage medium storing programming for execution by the processor, the programming including instructions to:
        obtain, from a network element, an initial uplink timing adjustment value during an initial random access procedure;
        after the initial uplink timing adjustment value is obtained, perform a downlink synchronization based on a downlink signal received from the network element; and
        transmit an uplink signal based on the downlink synchronization and the initial uplink timing adjustment value, the uplink signal being transmitted without performing an additional random access procedure and without waiting for a new timing advance signal.

10. The MTCD of claim 9, the programming further including instructions to:
    store the initial uplink timing adjustment value.

11. The MTCD of claim 9, wherein the uplink signal is a data signal.

12. The MTCD of claim 9, wherein a period between obtaining and transmission of the uplink signal comprises a period of sleep of the MTCD.

13. The MTCD of claim 12, wherein the period of sleep is greater than an uplink timing alignment period.

14. The MTCD of claim 9, wherein the MTCD is at a fixed location relative to the network element.

15. The MTCD of claim 9, wherein an internal timing element of MTCD drifts relative to a timing element of the network element before the MTCD receives the downlink signal from the network element.

16. The MTCD of claim 9, wherein timing advance signaling is disabled for the MTCD.

17. A non-transitory computer-readable device having instructions stored thereon that, when executed by a machine type communication device (MTCD), cause the MTCD to perform operations, the operations comprising:
    obtaining, from a network element, an initial uplink timing adjustment value during an initial random access procedure;
    after the obtaining, performing a downlink synchronization based on a downlink signal received from the network element; and
    transmitting an uplink signal based on the downlink synchronization and the initial uplink timing adjustment value, the uplink signal being transmitted without performing an additional random access procedure and without waiting for a new timing advance signal.

18. The non-transitory computer-readable device of claim 17, the operations further comprising:
    storing, by the MTCD, the initial uplink timing adjustment value.

* * * * *